(12) United States Patent
Rivin

(10) Patent No.: US 6,779,955 B2
(45) Date of Patent: Aug. 24, 2004

(54) MECHANICAL CONTACT CONNECTION

(76) Inventor: Evgeny I. Rivin, 4227 Foxpointe Dr., West Bloomfield, MI (US) 48323

( * ) Notice: Subject to any disclaimer, the term of this patent is extended or adjusted under 35 U.S.C. 154(b) by 46 days.

(21) Appl. No.: 10/144,060

(22) Filed: May 11, 2002

(65) Prior Publication Data

US 2003/0025282 A1 Feb. 6, 2003

Related U.S. Application Data

(60) Provisional application No. 60/308,951, filed on May 31, 2001, and provisional application No. 60/294,700, filed on May 31, 2001.

(51) Int. Cl.$^7$ .............................. B23C 5/26; B23Q 11/00
(52) U.S. Cl. ....................... 409/234; 409/232; 409/141; 408/143; 408/239 R; 403/372; 403/369; 267/141.7; 267/141.2; 267/137; 267/141.1; 188/379
(58) Field of Search ................................. 409/234, 141, 409/232, 233; 279/102, 103; 408/239 A, 239 R, 143, 238, 240; 403/372, 371, 369, 366; 267/141.7, 137, 141.1, 161, 141.2, 294, 292; 188/379

(56) References Cited

U.S. PATENT DOCUMENTS

| 2,179,959 | A | * | 11/1939 | Rolf .......................... 403/224 |
| 2,460,292 | A | * | 2/1949 | Nicholas .................. 267/141.7 |
| 2,510,979 | A | * | 6/1950 | Nicholas .................. 267/141.7 |
| 2,697,578 | A | * | 12/1954 | Whittam ................... 267/140.3 |
| 2,819,060 | A | * | 1/1958 | Neidhart .................. 267/141.1 |
| 3,242,791 | A | * | 3/1966 | Smith ......................... 188/379 |
| 3,318,401 | A | * | 5/1967 | Carbert ....................... 403/326 |
| 3,391,892 | A | * | 7/1968 | Rico et al. ................ 267/141.7 |
| 3,643,546 | A | * | 2/1972 | Richter et al. .............. 409/141 |
| 4,450,616 | A | * | 5/1984 | Morita ........................ 29/446 |
| 4,714,389 | A | * | 12/1987 | Johne ......................... 409/233 |
| 4,722,645 | A | * | 2/1988 | Regan ..................... 408/239 A |
| 4,897,006 | A | * | 1/1990 | Blin ............................ 411/368 |
| 4,934,883 | A | * | 6/1990 | Andersson et al. ......... 409/234 |
| 5,322,304 | A | * | 6/1994 | Rivin ......................... 409/234 |
| 5,398,916 | A | * | 3/1995 | Kramer et al. ................ 267/70 |
| 5,413,318 | A | * | 5/1995 | Andreassen ................. 408/143 |
| 5,595,391 | A | * | 1/1997 | Rivin ......................... 409/234 |
| 5,716,173 | A | * | 2/1998 | Matsumoto ............. 408/239 A |
| 5,791,847 | A | * | 8/1998 | Keto-Tokoi ................. 411/368 |
| 5,975,816 | A | * | 11/1999 | Cook .......................... 409/141 |
| 5,997,226 | A | * | 12/1999 | Tagami ...................... 409/231 |
| 6,071,219 | A | * | 6/2000 | Cook .......................... 409/234 |
| 6,224,306 | B1 | * | 5/2001 | Hiroumi et al. ............ 409/234 |
| 6,599,068 | B1 | * | 7/2003 | Miyazawa .................. 409/234 |

FOREIGN PATENT DOCUMENTS

| DE | 263-484 A | * | 1/1989 | ............. 408/239 A |
| SU | 1161737 A | * | 6/1985 | ................. 408/143 |
| WO | WO-01/76814 A1 | * | 10/2001 | |

OTHER PUBLICATIONS

ASM Handbood, vol. 20, Materials Selection and Design, 1997, ASM International, p. 271.*

Rivin E.I., "Tooling Structure: Interface between Cuttting Edge and Machine Tool", Annals of the CIRP, 2000, vol. 49/2/2000, pp. 591–634.

Rivin, E.I., "Stiffness and Damping in Mechanical Design", Marcel Dekker, 1999, pp. 156–161,

* cited by examiner

Primary Examiner—Erica Cadugan

(57) ABSTRACT

A surface connection between mechanical components having intermediate deformable elements between the connected contact surfaces, shaped as segments of solid or hollow cylinders with straight or curvilinear axes and their cross sections are compressed in the radial direction during assembly of the connection, thus allowing for adjustments of relative positioning of the connected components, for compensating dimensional imperfections, and for enhancement of stiffness and/or damping of the connection.

1 Claim, 3 Drawing Sheets

MECHANICAL CONTACT CONNECTION

Priority for this application is requested to be May 31, 2001 per Provisional Patent Applications 60/308,951 now abandoned and 60/294,700

FIELD OF THE INVENTION

The invention relates to the area of mechanical design and to connections/joints between assembled mechanical components.

BACKGROUND OF THE INVENTION

Many mechanical systems such as precision machine tools and instruments, robots, etc., comprise structural blocks attached to other structural blocks through surface contact connections. The connections can be permanent, such as a bolted connection between the headstock and the bed of a lathe. Another group is infrequently disconnectable systems, such as so-called "reconfigurable machining systems" composed of standard units assembled in various combinations for using in a production line for a certain product and reconfigured for fabrication of a new product. The third widely used type of connections is for connecting interchangeable tools, measuring heads, etc., in a precision location to permanent structural components, such as spindles of machining centers or turrets of lathes. In all these three cases, but especially in the second and third ones, high precision of the assembled systems is required, thus an adjustment of the final assembly is often desirable.

In the first case (permanent assembly) the connected parts are often fabricated for fitting the designated specific counterparts, and the connection may be finish-machined during the assembly process.

Such an expensive procedure cannot be accepted for assembly of a reconfigurable machining system. In this case, no finish machining can be tolerated during the assembly, since each unit has to be suitable for connecting with any other unit of the system, so that any "finishing" would damage the whole system. In such circumstance, an adjustability built into the system design would be very desirable. Unfortunately, no adjustable connections are available, and usually flat contact surfaces preloaded by bolts are used as connections. Their dimensions can be adjusted somewhat by changing the preloading force, but reduction of the preloading force results in a significant and often unacceptable reduction of stiffness of the connection, while increase of the preloading force results in undesirable reduction of damping.

Even more interchangeability is required for connecting tools and measuring heads with the base system in the third case. Both high accuracy and overall tightness for achieving high stiffness ("perfect fit" to realize a simultaneous contact both on tapered surfaces and on the face surfaces of the connection) are required. However, it would be prohibitively expensive to standardize extremely tight tolerances for tens of thousands spindles and turrets and for millions of toolholders, for them to be able to perfectly fit each other in random combinations. Thus, the adjustability or means for compensating dimensional variations are needed even more.

Sometimes in all these cases a specified stiffness of the connection is required. However, conventional surface contact connections are highly nonlinear and any change in preloading force changes the stiffness.

The need for compensation ability is the most clearly understood in application to the last case (tool interchange), and is realized by designing elastic deformations into the system, especially into toolholder/spindle interface system.

There are two basic systems for incorporating flexibilities into the toolholder/spindle interface system.

One technique is represented by tapered toolholders HSK (German DIN Standard) and KM (Kennametal Corp.), both described in Rivin E.I, "*Tooling Structure: Interface between Cutting Edge and Machine Tool*", Annals of the CIRP, vol. 49/2/2000, pp. 591–634, wherein the tapered body to be fit into the reciprocating tapered hole in the spindle/turret is a high precision hollow structure slightly deforming when pulled in by the drawbar, thus realizing the "perfect fit" with the simultaneous taper/face contacts. Very shallow taper connections (1/10) are used in these systems in order to increase the mechanical advantage and thus to facilitate the deformation of the rather rigid structures. Shortcomings of this technique are the costs of precision fabrication of a complex shape; a large variation (about 2:1 even for the standardized very high precision) of the degree of interference between the male and female tapers resulting in the reduced performance consistency; reduced effective stiffness of the clamped tools due to increased overhang caused by the hollow structure of the toolholder (e.g., see the above quoted article).

Another technique is represented by U.S. Pat. Nos. 5,322,304 (the Prior Art) and 5,595,391, both granted to the present inventor. FIGS. 1, 2, 3 from U.S. Pat. No. 5,322,304 show toolholder 60 to whose tapered surface precision balls 68 are attached by means of cage 66 as precision flexible elements. When the toolholder is inserted into tapered spindle hole 14 and pulled into it by the drawbar (not shown, is engaging with part 60b by threaded adapter 22), radial deformations of balls 68 allow for toolholder 60 to move inside spindle hole 14 as much as needed in order to achieve the simultaneous contact between the male and female tapered surfaces (via balls 68) and also between flange 60c of the toolholder and face 16 of the spindle. Since high precision balls of various diameters and materials are available off-the-shelf and are inexpensive, and since the required modification of the standard toolholders (reducing diameter of the tapered part to accommodate the balls) does not increase their design complexity and costs, this system works reasonably well. However, it is usually applied to the so-called "steep taper" (7/24 taper) standard toolholders whose multi-million inventory is widely used in manufacturing plants. These toolholders, as standardized, have rather loose tolerances and also are often used with reground spindles or turrets thus further increasing the scatter of the dimensions and, effectively, loosening the tolerances and expanding requirements to compensation of the axial distance between the spindle face and the toolholder flange. Considering these factors, the required axial dimensional compensation is up to 150–200 $\mu$m requiring radial deformation up to 30 $\mu$m of the flexible elements attached to the toolholder. However, the safe allowable elastic deformation of precision steel and titanium balls of typical 5 mm diameter is only about 5–10 $\mu$m (0.1–0.2% relative compression).

Dynamic stability and other performance characteristics of modern high speed/high power/high accuracy machines are dependent on their structural stiffness but also on damping which is largely determined by the structural connections, e.g. see Rivin, E.I, "*Stiffness and Damping in Mechanical Design*", Marcel Dekker, 1999. The techniques mentioned above for achieving the simultaneous taper and face contact between the toolholder and the spindle flange unfortunately do not increase damping in the connection. While both stiffness and damping are to a large extent controlled by connections/joints between the mechanical components, the stiffness is increasing with increasing contact pressures in the joints but damping is changing in the opposite direction, e.g., see the above quoted book. At low contact pressures ~1 MPa (150 psi), damping in a flat joint is characterized by log decrement δ=~0.075, but the stiffness of such joint is inadequate for many applications. Increase of the contact pressure to ~3 MPa (450 psi) results in ~1.5 times stiffness increase but damping falls to δ=0.03. In critical applications, expensive and often bulky special damping means are used, such as squeeze film dampers or dynamic vibration absorbers.

SUMMARY OF THE INVENTION

The instant invention provides means for solving the above-addressed problems and eliminating or alleviating the mentioned shortcomings of the conventional mechanical connections by inserting segments of precision cylinders, made from materials whose Young's modulus is at least one-tenth of the lowest Young's modulus of the materials of the connected mechanical components, between the contact surfaces of the mechanical components being connected, thus resulting in high stiffness or in high stiffness/high damping combination in mechanical connections/joints while in the same time being robust and not significantly influencing costs and weight of the systems where the proposed technique is used.

A design technique for a connection between two conforming and pressed together surfaces is disclosed, in which intermediate cylindrical segments of uniform cross sectional diameter and having initial line contact with at least one surface are inserted between the joined surfaces.

According to the invention, the connection is preloaded, thus causing radial elastic deformation of the cylindrical segments.

Depending on the design needs, the stiffness of the connection can be adjusted by using cylinders with different diameters, with round or elliptical cross sectional shapes, with different ratios of the internal and external diameters (the limiting case being the internal diameter equal zero), and different materials.

The proposed technique allows to perform a fine adjustment of the linear and/or angular positioning of the connected components without stiffness change of the connection.

According to another feature of the invention, introduction of cylindrical segments into the connection allows to compensate dimensional variation of the connected mechanical components and to resolve statically indeterminate situations.

According to a further feature of the invention, the cylindrical elements are made from a shape memory or a superelastic material, allowing to realize an extremely large range of fine adjustment, while exhibiting a very significant amount of damping.

BRIEF DESCRIPTION OF THE DRAWINGS

The present invention can best be understood with reference to the following detailed description and drawings in which.

DESCRIPTION OF THE PREFERRED EMBODIMENTS

A conventional meaning of the term "cylinder" is a body symmetrical relative to its straight axis and having all identical round or elliptical cross sections in any plane perpendicular to the axis. In this Specification, the term "cylinder" or "cylindrical segment" extends to a geometrical body which can be described as an initially conventional cylinder whose axis is bent without distorting the cross sections. Thus, for the sake of this Specification a "cylinder" or a "cylindrical segment" is a body having a straight or a curvilinear axis whose cross sections by planes perpendicular to the axis are symmetrical relative to the center of the cross section (the trace of the axis on the cross sectional plane), are all identical, and whose periphery is round (circle) or an ellipse. The cross sections can be solid (a wire-like cylindrical body) or have a central hole (tube-like cylindrical body).

Figure 4:
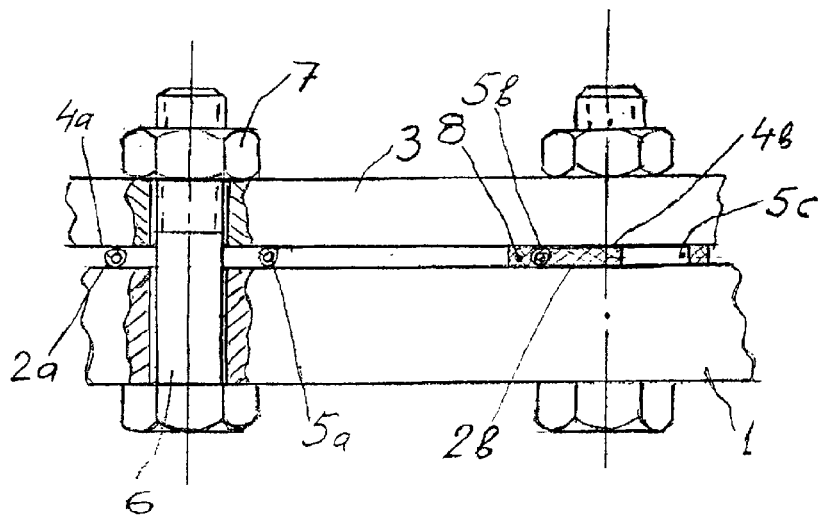
FIG. 4 presents a cross section view of a generic embodiment of mechanical contact connection per the present invention.
Figure 5:
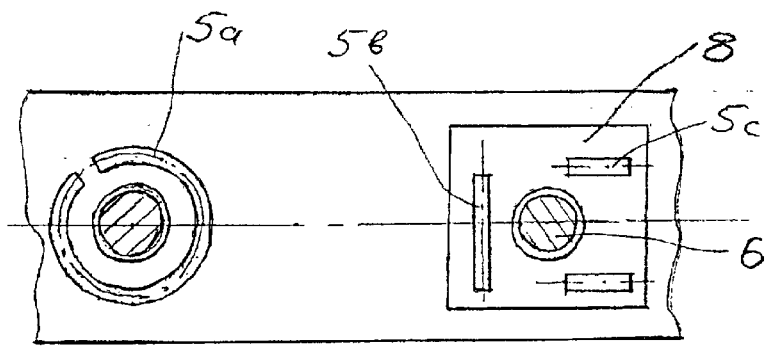
FIG. 5 shows a "bird's view" on the connection in FIG. 4 with one connected mechanical component removed.
Figure 8:
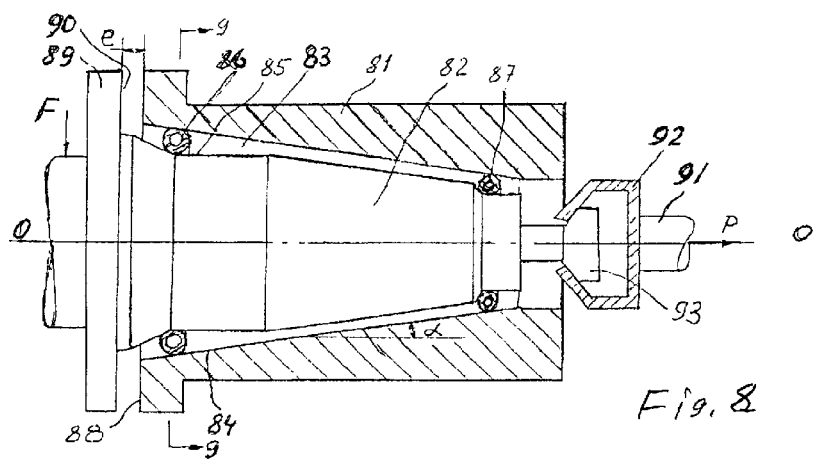
FIG. 8 shows an axial cross section of a tapered connection per the present invention wherein simultaneous taper and face contacts can be realized.
Figure 10:
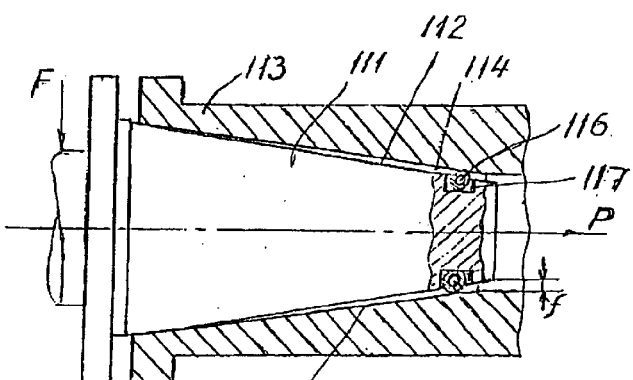
FIG. 10 shows an axial cross section of another tapered connection per the present invention wherein a ring-shaped cylindrical element is used to assure concentricity of the connection.
Figure 11:
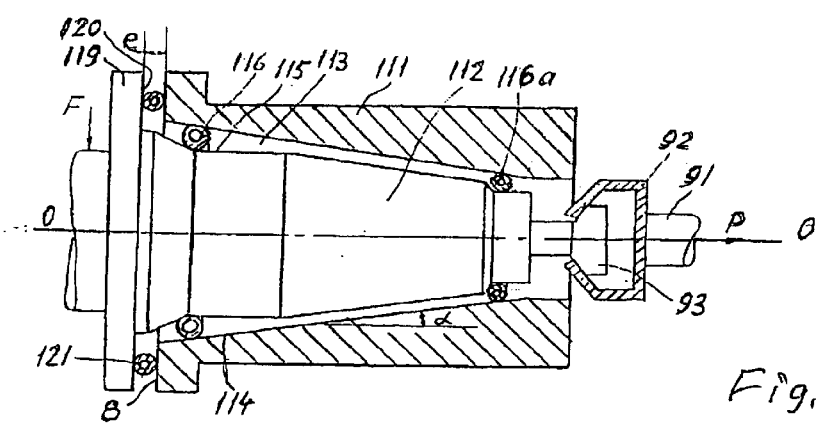
FIG. 11 shows an axial cross section of yet another tapered connection per the present invention wherein both taper and face contacts are realized through cylindrical segments.

FIG. 4 shows a side view of a generic embodiment of the proposed mechanical connection (joint) between first mechanical component 1 and second mechanical component 3, these components having arbitrarily shaped but conforming "first" and "second" contact surfaces 2 and 4, respectively. In the shown connection the contact surfaces comprise two flat areas (surfaces 2a, 4a and surfaces 2b, 4b). The connections shown below in FIGS. 8, 10, 11 illustrate the connections between curved (conical) surfaces. Hollow cylindrical segments 5a,b,c with round cross sections are inserted between contact surfaces 2 and 4. The connection is established when contact surfaces 2 and 4 are moved towards each other by an external (preloading) force thus compressing cylindrical segments 5. This external force is applied in the assembly in FIG. 4 by tightening preloading bolts 6 with nuts 7, although many other preloading techniques known in the art can be used, e.g. preloading by a drawbar for connections in FIGS. 8, 10, 11 below. FIG. 5 shows a "bird's view" towards contact surface 2 with component 3 removed, thus illustrating placement of cylindrical segments 5. Two alternatives for handling tubular segments 5 are shown in FIGS. 4 and 5. While in the area a (contact surfaces 2a and 4a) cylindrical segment 5a is shown to be placed without restraint or is tacked to one of surfaces 2a, 4a, in the area b (contact surfaces 2b, 4b) cylindrical segments are "organized" by being surrounded by a soft matrix 8 (e.g. made of rubber, plastic, foam, etc.) defining the relative positioning of tubular segments 5 but not influencing to a significant degree their deformation characteristics. The matrix can be attached to one or both surfaces 2b, 4b. Since the instant invention is aimed to improvements of mechanical structural connections, stiffness is an important characteristic of the connection. Accordingly, cylindrical segments 5 should be made from a rigid material whose Young's modulus is at least one-tenth of the lowest Young's modulus of components 1 and 3.

Placement of cylindrical segments 5 between conforming contact surfaces 2 and 4 results in confining contact areas only to contact strips (initially—line contacts) between cylinders 5 and contact surfaces 2 and 4, notwithstanding inevitable small deviations of contact surfaces 2 and 4 from ideal conformity. Due to much higher local stiffness of the direct contact between surfaces 2 and 4 in the conventional assemblies without intermediate inserts between the contact surfaces, these small deviations would result in a significant redistribution of the contact forces. Large allowable local elastic deformations of cylinders 5, as shown below, provide for compensation of inevitable deviations of contact surfaces 2 and 4 from the ideal conformity. Another specific feature of this embodiment is constant stiffness of the connection regardless of the preload force, since the deformations of radially loaded cylinders, both solid and hollow, are of a linear character (deformation is approximately proportional to load) within its elastic region.

Another feature of the embodiment in FIG. 4 is adjustability of the relative translational (closeness) and angular (tilt) positioning of components 1 and 3 by a proper differential adjustment of preloading means 6, 7. It is important to note that the angular adjustment also does not affect stiffness of the connection.

Figure 6:
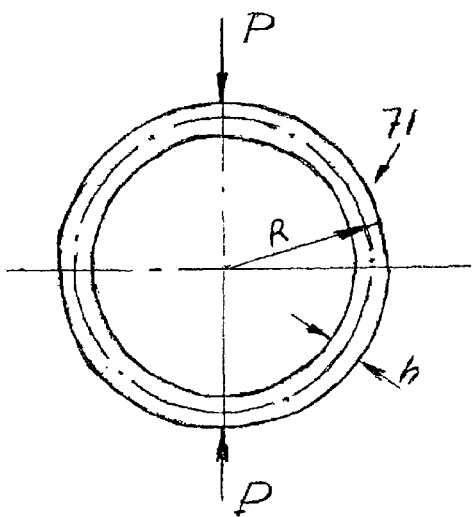
FIG. 6 depicts a ring or a tubular cylinder having a round cross section and compressed by two opposing forces.

Operation of the concept illustrated by FIG. 4 is based on basic deformation properties of a ring or a cylindrical tube loaded by diametrically opposed compression forces P. The deformation process is the same for a ring and for a similarly loaded (by the axially distributed uniform loads) hollow cylindrical segment 71 (length L) whose cross section is the ring shown in FIG. 6. Deformation of the hollow cylindrical segment can be compared with deformation of rectangular block 72 shown in cross section in FIG. 7 (its depth is d) and uniformly loaded in compression with the same total load P. The compression of block 72 in FIG. 7 can be described by the well known Hooke's Law, $$\sigma = E\varepsilon, \tag{1}$$

where $\sigma = P/A = P/cd$ is compression stress, uniform across the cross section of the block by a horizontal plane, $\varepsilon = \Delta/H$ is relative compression deformation of the block, $A = cd$ is loaded cross sectional area of the block, $\Delta$ is compression deformation of the block, and E is Young's modulus. The maximum elastic (reversible) relative compression deformation $\varepsilon_{max}$ occurs at the maximum elastic stress (yield strength) $\sigma_y$ of the selected material. For example, for cold finished stainless steel 316, $\sigma_y = 310$ MPa (45,000 psi), $E = \sim 2 \times 10^5$ MPa ($30 \times 10^6$ psi), and $$\varepsilon_{max} = \sigma_y/E = 0.0015 = 0.15\%. \tag{2}$$

Figure 1:
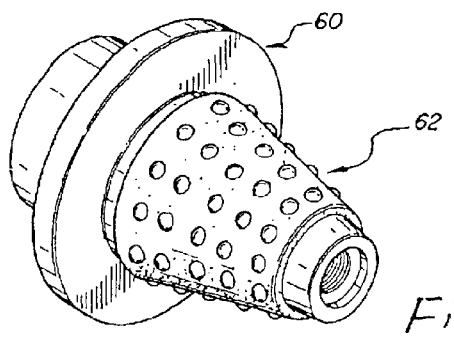
FIG. 1 shows an isometric view of the prior art mechanical connection—a toolholder with the attached precision flexible elements shaped as precision balls.
Figure 3:
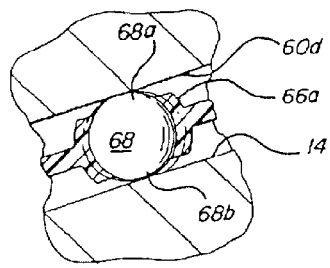
FIG. 3 shows an expanded view of a segment encircled by a dotted line in FIG. 2 of the prior art mechanical connection in FIG. 2.
Figure 2:
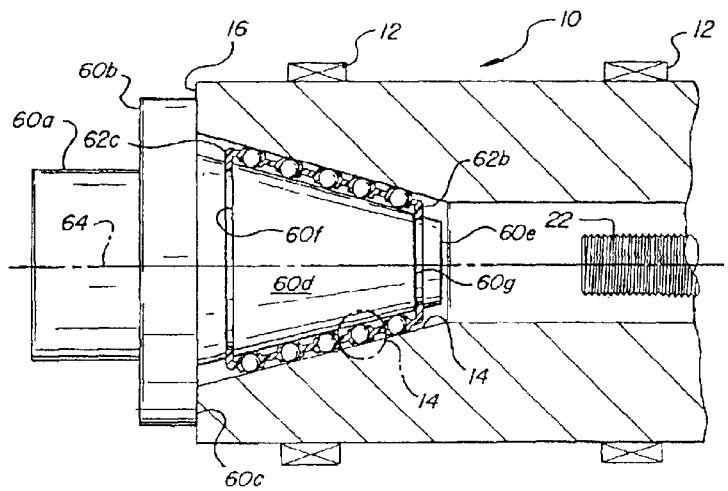
FIG. 2 shows an assembly drawing (the tapered toolholder with attached precision balls inserted into the tapered hole of the spindle) of the prior art mechanical connection.
Figure 7:
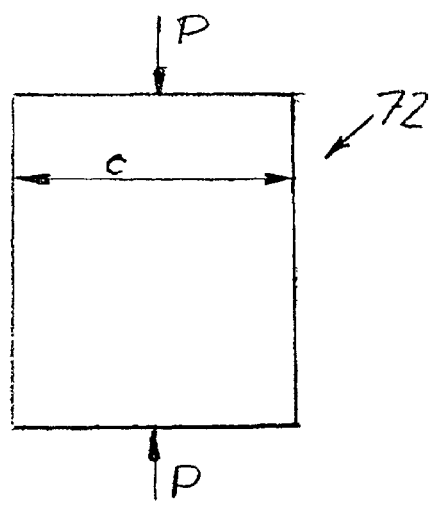
FIG. 7 depicts a uniformly uniaxially compressed rectangular block.

This value of $\varepsilon_{max}$ is similar to 0.1–0.2% elastic compression for balls used in the prior art design shown in FIGS. 1–3. For hollow cylinder 71 shown in FIG. 6, with the assumption that the wall thickness $h \leq 0.1$ R, the overall relative diametrical compression along the line of action of forces P is $$\varepsilon = \frac{\Delta}{D} = \frac{\Delta}{2R} \approx \frac{0.5R}{Eh}\sigma_{max}, \tag{3}$$

where $\sigma_{max}$ is the highest tensile/compression stress in the wall of the annular cross section caused by compression forces P, and D is the outer diameter of the cross section periphery. Thus, the maximum elastic radial compression of tube 61 is $$\varepsilon_{max} = \frac{0.5R}{Eh}\sigma_y, \tag{4}$$

or for the same steel as above and $h = 0.1$ R, $$\varepsilon_{max} = 0.0078 = 0.78\%, \tag{5}$$

more than five times greater than for the solid block in FIG. 7. Even greater difference is for tubes with thinner walls, e.g. for $h = 0.06$ R, $$\varepsilon_{max} = \sim 0.013 = 1.3\%. \tag{6}$$

Such large elastic range allows for a very large range of dimensional (translational and angular) adjustment of the connection in FIG. 4 and/or for using much smaller distances between the connected components (small R) while still maintaining the adjustability. Stiffness of the connection in FIGS. 4, 5 can be varied by changing the overall length of the cylindrical segments, their material (E), their diameter, and the wall thickness. For the latter, the limiting value is $h = R$, or a solid wire with no hole.

So-called "superelastic" materials as well as shape memory materials, both exemplified by NiTi alloys, have elastic strain limit for tension $\varepsilon_{max} \leq 6-8\%$. However, testing of hollow (tubular) cylindrical specimens made from such materials under radial compression has shown $\varepsilon_{max} = 18-20\%$, and testing of solid (wire-like) cylindrical specimens under radial compression has shown $\varepsilon_{max} = 23-24\%$. Both hollow (tubing) and solid (wires) cylinders made from superelastic and shape memory materials are readily available "off-the-shelf" at reasonable prices. Thus, the same elastic compression deformation as can be achieved with steel balls 5 mm diameter in prior art design in FIGS. 1–3, can be achieved with the hollow steel cylinders (tubing) with $\varepsilon_{max} = 1.3\%$ at diameter 0.5–1.0 mm, and with superelastic hollow/solid (tubing/wires) cylinders at diameter 0.05 mm.

For hollow cylinders with thicker walls, as well as for elliptical cross sections, expression (4) can still be used for qualitative comparisons.

Another advantage of the hollow and solid cylindrical elements, in addition to the greater elastic range, is a relative easiness to obtain consistently accurate dimensions (diameter D), even for the off-the-shelf wires and tubing. It was established that the diameter variation of both solid wires and tubing made from shape memory/superelastic alloys NiTi does not exceed 1–2 μm for a 250 mm long specimen.

FIG. 8 shows another embodiment of the instant invention wherein first mechanical component (toolholder in this case) 82 is inserted into tapered hole 83 of second mechanical component (spindle in this case) 81. The connection between outer (contact) surface 85 of toolholder 82 and inner (contact) surface 84 of spindle 81 is realized via hollow cylindrical (tubular) rings 86 and 87, both tightly fit or attached to one contact surface (attachment to contact surface 85 is shown, but the rings can be, alternately, attached to contact surface 84). The outlining dimensions of the extreme outer surfaces of rings 86 and 87 are selected in such a way that they define a "virtual" tapered surface with the same or insignificantly different angle of conicity α as contact surface 84. While two rings are shown, being the minimal number defining the virtual conical (tapered) surface, more rings or other cylindrical segments attached to the same mechanical component 82 can be used, provided that the convex virtual surface defined by all rings/segments conforms, may be with insignificant deviations, with contact surface 84 of second mechanical component 81.

The term "insignificant" twice used above is defined as being substantially less than allowable radial deformation of the cylinders comprising each ring or cylindrical segment.

Rings 86 and 87 are shown as having different cross sections and wall thickness. They (and additional ring-shaped cylinders or other cylindrical segments) can also be made from different materials.

Figure 9:
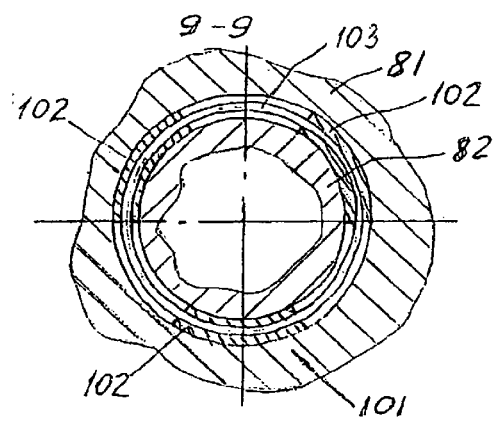
FIG. 9 shows cross section by a plane 9—9 of the tapered connection in FIG. 8.

While the cross section shown in FIG. 8 implies full (360°) ring-shaped cylinders, ring-shaped cylindrical segments totaling less than 360° can be used, preferably located in the same plane perpendicular to the axis of the connection. FIG. 9 shows cross section by 9—9 of ring-shaped cylinder 86 in FIG. 8 embodied as a composition ring 101. This composition ring 101 is composed of tubular segments 102 stringed on holding wire 103 with a small clearance between holding wire 103 and internal surfaces of tubular segments 102. Composition ring 101 is attached to mechanical components 82 preferably, but not necessarily, by interference fit. Holding wire 103 can be made from a material with regular elasticity ($\epsilon_{max}$) e.g. from steel, or from a material with enhanced elasticity, such as superelastic material or plastic (e.g., Kevlar).

In operation, first mechanical component (toolholder) 82 is inserted into tapered hole 83 of second mechanical component (spindle) 81 until at least one of ring-shaped cylindrical segments 86, 87 is in contact with both first and second mechanical components. The connection has to be dimensioned in such a way, that at this moment the distance e between contact face surface 88 of component 81 and contact surface 90 of flange 89 of component 82 does not exceed allowable elastic radial compression deformation (characterized by value of $\epsilon_{max}$) of the tubular ring in contact with both mechanical components, as modified by the wedge action of the taper connection. For example, for 7/24 taper connection, there should be $$e_{max} \leq (24/3.5)D\epsilon_{max} = 6.85D\epsilon_{max}. \quad (7)$$

For example, for rings 86, 87 made from cylinders (wire or tubing) D=1 mm diameter, it can be computed from (7) that $\epsilon_{max}$=0.013 for steel tubing as in (6), and $e_{max}$=0.019 mm=89 μm. For superelastic tubing D=1 mm, $\epsilon_{max}$=~0.18, and $e_{max}$=1.23 mm=1,230 μm. If the initial distance e between contact surfaces 88 and 90 does not exceed these values of $e_{max}$, pulling (with force P) of component 82 by drawbar 91, engaged by gripper 92 with retention knob 93 of component 82, would result in simultaneous taper/face contact between components 81 and 82 without exceeding maximum allowable radial elastic compression deformation of ring-shaped cylindrical segments 86, 87. Thus, the dimensional scatter of the initial axial clearance e between components 81 and 82 is compensated by application of the proposed concept. For the specific example in the "Background of the Invention" above for toolholder/spindle connection with a possibility of regrinds of the tapered hole of the spindle, variation of e does not exceed 200 μm. Thus, use of 1 mm diameter superelastic wire or tubing for rings 86, 87 would satisfy the requirements with a substantial margin of safety, while diameter of steel wire or tubing for the same purpose should be about 2.5 mm.

FIG. 10 shows another version of a tapered connection wherein first mechanical component (toolholder) 111 having external convex tapered ("first") surface 112 and being inserted into tapered hole 114 of second mechanical component (spindle) 113 having internal concave tapered surface 115 with a different taper (conicity) angle thus resulting in the clearance f between two interacting tapered surfaces 112 and 115. The case shown in FIG. 10 is characterized by the angle of the male taper (112) being larger than the angle of the female taper (115), so that the clearance f is at the back (narrow end) of the connection. Obviously, this correlation can be reversed with the clearance occurring at the front (wide) side of the connection. Ring-shaped cylindrical element 116 made from one or more (e.g., as shown in the cross section in FIG. 9 of a similar ring-shaped cylindrical element 86 in FIG. 8) tubular segments is placed into groove 117 made in convex taper surface 112 on the side of the clearance. Groove 117 and ring 116 are dimensioned in such a way that when first mechanical component 111 is pulled into tapered hole 114, e.g. by a drawbar system (not shown, e.g. similar to drawbar system 91-92-93 in FIG. 8), the first contact occurs between the "second" surface 115 and the outside surface of ring 116.

A continuing pull of toolholder 111 into hole 114 is accompanied by radial deformation of the cylindrical segments constituting ring 116 until the opposite end of toolholder 111 (front end or left side in FIG. 10) touches tapered surface 115 and the relative axial motion between first mechanical component 111 and second mechanical component 113 stops.

The embodiment in FIG. 10 is useful in cases wherein there is no need for the simultaneous taper/face contact as in the embodiment of FIG. 8, but concentricity (coaxiality) of toolholder 111 and spindle 113 is desirable. Even when the nominal conicitty angles of surfaces 112 and 115 are identical, there is always inevitable angular differential between the male and female tapers. For example, for toolholders the relevant standards specify smaller or larger angular differentials, depending on the degree of precision of the connection, wherein the angle of the male (toolholder) taper is always greater than the angle of the female (spindle) taper, as shown in FIG. 10. The clearance f caused by this angular mismatch translates into radial misalignment between toolholder 111 and hole 114, and into undesirable radial runout of a tool or a measuring head attached to toolholder 111. Placement of deformable cylindrical ring 116 eliminates the misalignment and greatly reduces the runout.

In the embodiment of FIG. 8 rings 86 and 87 are deforming only in the process of insertion of tapered mechanical component 82 into tapered hole 83 in order to compensate dimensional variations of the connection and assure the contact between surfaces 88 and 90 (the "face contact") of the connected mechanical components. After the face contact is established, it accommodates the external forces, e.g. cutting force F acting on toolholder 82, and rings 86 and 87 are not exposed to these external forces and are not noticeably deformed by the latter. Consequently, the material damping of rings 86 and 87, which may be significant if the rings are made from a high damping material such as a superelastic alloy, is not utilized. The damping property is utilized only if the component possessing the damping property is subjected to deformation causing energy dissipation.

The embodiment of the present invention shown in FIG. 10 is characterized by the fact that connected mechanical components 111 and 113 have two contact areas after the connection is assembled. One area in the front of the connection is a direct, a relatively rigid, contact between contact surfaces 112 and 115, and the other area in the back of the connection is an indirect contact via ring 116 which is flexible due to compliance of ring 116. In such an assembly the external forces, e.g. the cutting force F acting on toolholder 111 cause small angular oscillations of toolholder 111, wherein the rigid frontal contact area behaves as a pivot and ring 116 exhibits radial deformations. If ring 116 is made from a high damping material such as a superelastic alloy, these radial deformations would constitute damping in the connection.

FIG. 11 illustrates an embodiment of the instant invention wherein first mechanical component (toolholder) 112 is inserted into tapered hole 113 of second mechanical component (spindle) 111. The connection between outer (contact) surface 115 of toolholder 112 and inner (contact) surface 114 of spindle 111 is realized via cylindrical rings 116 and 116a, both tightly fit or attached to one contact surface (attachment to contact surface 115 is shown, but the rings can be, alternately, attached to contact surface 114 instead). The extreme outer surfaces of rings 116 and 116a are selected in such a way that they define a "virtual" tapered surface with the same or insignificantly different angle of conicity as contact surface 114. Similarly to FIG. 8, while two rings are shown, being the minimal number defining the virtual conical (tapered) surface, more rings or other cylindrical segments attached to the same mechanical component 112 can be used, provided that the convex virtual surface defined by all rings/cylindrical segments conforms, may be with insignificant deviations, with contact surface 114 of second mechanical component 111. A set of cylindrical tubular segments 121 is placed between contact face surface 118 of component 111 and contact surface 120 of flange 119 of component 112.

In operation, first mechanical component 112 is inserted into tapered hole 113 of second mechanical component 111 until at least one of rings 116, 116a is in contact with both first and second mechanical components and then the pulling force P is applied. The connection has to be dimensioned in such a way, that at the nominal (rated) magnitude $P_r$ of this force, both cylindrical rings 116 and 116a and cylindrical segments 121 between contact face surface 118 of component 111 and contact surface 120 of flange 119 of component 112 are deformed. Since there is no direct contact between the connected mechanical components, and all contacts are via tubular cylindrical elements 116, 116a, and 121, the external forces, such as cutting force F, cause deformations of all these tubular segments and all these deformations contribute to damping of the system if the tubular elements are characterized by significant material damping. The required stiffness values of the connection in various directions can be adjusted by selecting dimensions of the tubular segments and their materials.

It is readily apparent that the embodiments of the mechanical connection disclosed herein may take a variety of configurations. Thus, the embodiments and exemplifications shown and described herein are meant for illustrative purposes only and are not intended to limit the scope of the present invention, the true scope of which is limited solely by the claims appended thereto.

What is claimed is:

1. A mechanical contact connection between first and second mechanical components having respective first and second contact surfaces and comprising intermediate deformable connecting elements located between said first and second contact surfaces and means for causing relative displacement of said first and second contact surfaces thus causing compression deformation of said intermediate deformable connecting elements, said relative displacement and compression deformation being applied during assembly of said connection, wherein said intermediate deforming connecting elements are shaped as cylindrical segments having round cross sections perpendicular to their central axes and made of a material having a Young's modulus lesser than the lowest Young's moduli of the materials of said mechanical components and having initial, before said compression deformation has initiated, line contacts along their central axes with each mechanical component, and wherein the cylindrical segments are hollow and are connected by a string passing through inner openings of said cylindrical segments.

* * * * *